United States Patent [19]

Peltonen et al.

[11] Patent Number: 5,467,381
[45] Date of Patent: Nov. 14, 1995

[54] METHOD AND SYSTEM FOR RESTRUCTURING A CALL SIGNAL FRAME IN A CELLULAR MOBILE TELEPHONE SYSTEM HAVING DIRECTORY AND ROUTING NUMBER

[75] Inventors: Ari Peltonen, Aachen, Germany; Bo A. V. Åström, Tullinge, Sweden; Mars V. Gandils, Älvsjö, Sweden; Mats O. Stille, Stockholm, Sweden; Sven J. Lantto, Tullinge, Sweden

[73] Assignee: Telefonaktiebolaget LM Ericsson, Stockholm, Sweden

[21] Appl. No.: 205,154

[22] Filed: Mar. 3, 1994

[30] Foreign Application Priority Data

Mar. 4, 1993 [SE] Sweden ................... 9300721

[51] Int. Cl.$^6$ ........................................ H04Q 7/38
[52] U.S. Cl. ................... 379/58; 370/56; 379/59
[58] Field of Search ...................... 370/8, 24, 41, 370/56, 58.1, 58.2, 77, 95.1, 110.1, 112; 375/205; 379/58, 59, 60, 62, 67, 88, 91, 112, 114, 127, 144, 198, 201, 215, 221, 223, 260, 267, 269, 277, 334

[56] References Cited

U.S. PATENT DOCUMENTS

| | | | |
|---|---|---|---|
| 4,393,495 | 7/1983 | Cray et al. | 370/56 |
| 5,335,265 | 8/1994 | Cooper et al. | 379/59 |
| 5,353,331 | 10/1994 | Emery et al. | 379/58 |

FOREIGN PATENT DOCUMENTS

WO92/13428 8/1992 WIPO.
WO92/22174 12/1992 WIPO.

OTHER PUBLICATIONS

European Telecommunications Standards, "International Mobile Station Equipment Identities", Jul. 15, 1988.
Mouly, Pautet, "The GSM System for Mobile Communications" 1992.
I. Brini et al., "International Roaming in Digital Cellular Networks", CSELT Technical Reports, vol. XX, No. 6, pp. 531–536 (Dec. 1992).
CCITT Recommendation O. 1051, Fascicle VI. 13, pp. 88–91.
Internode Specifications–Digital Mobile Telecommunications Network, Ver. 3.2, pp. 280–291 (1992).

Primary Examiner—Curtis Kuntz
Assistant Examiner—William Cumming
Attorney, Agent, or Firm—Burns, Doane, Swecker & Mathis

[57] ABSTRACT

A method and apparatus for avoiding the use of specially allocated, temporary roaming numbers in a mobile telephone system for routing outside calls to a mobile subscriber roaming in the system. An incoming standardized call signal frame comprising a first parameter field including a directory number is reconstructed. The directory number in the first parameter field is replaced with the unique routing number of the mobile telephone switching center within whose service area the mobile subscriber roams. A unique international mobile subscriber identity and the directory number are inserted in a second parameter field. This implies a static addressing principle in which the routing address will also contain directly the number of the called subscriber. This facilitates restoration of certain registers after a failure.

7 Claims, 2 Drawing Sheets

METHOD AND SYSTEM FOR RESTRUCTURING A CALL SIGNAL FRAME IN A CELLULAR MOBILE TELEPHONE SYSTEM HAVING DIRECTORY AND ROUTING NUMBER

BACKGROUND

The present invention relates to a method of restructuring in a cellular mobile telephone system a standardized signal frame arriving at the mobile telephone system, so as to facilitate the routing of calls to a mobile telephone which roams within at least one localization region and store positional information so as to enable the information to be readily restored subsequent to a functional fault in the storage medium.

A public mobile telephone system which is intended to cover a large area requires advanced procedures in order to be able to route a call to a roaming subscriber to the radio base station which is in radio contact with the mobile telephone of the subscriber at that particular moment in time. Since permanent telephone networks and Integrated Services Digital Networks (ISDN networks) and possibly other public land mobile telephone networks may be involved in a call, it is important that each point in the system quickly obtains information as to where the roaming subscriber can be paged. Comprehensive signalling is therefore required in order to keep the information in the system updated.

Known mobile telephone systems are NMT (Nordic Mobile Telephone System), TACS (Total Access Mobile Telephone System) and GSM (Groupe Spécial Mobile). NMT and TACS are described, for instance, in CMS88 Cellular Mobile Telephone System, ERICSSON document EN/LZT 101 908 R2, 1988, whereas the GSM-system is described in CME 20 SYSTEM, ERICSSON document EN/LZT 120 226 R2A, 1991. These mobile telephone systems use mobile services switching centres (MSC), each of which is connected to a number of radio base stations (BS) which maintain radio contact with mobile subscribers (MS) which roam within radio coverage areas. These mobile services switching centres have means (VLR, GLR) for keeping an account of which subscribers are located within the service range of respective switching centres. In the system described in the following, the means (VLR, GLR) is physically integrated with the switching centre, which is accordingly referenced MSC/VLR or MSC/GLR. At least one home location register (HLR) is provided for the whole network, this register keeping an account of all data relating to those subscribers which belong to the network. The network is reached through a special gateway mobile services switching centre GMSC, which translates an incoming call to the address register of the called subscriber in HLR. The location of the subscriber in the network can then be traced with the aid of the information contained in the home location register HLR and a connection can be set up from MSC to the mobile subscriber MS. The location of the mobile subscriber is reported immediately as a switching centre discovers that the subscriber has entered its service area. Signalling is effected with signalling protocol according to CCITT No. 7, Common Channel Signalling. The protocol MAP (Mobile Applications Part) specified in CCITT recommendation Q.1051 is utilized between the gateway-MSC and the register HLR, and between the home location register HLR and the switching centre MSC/GLR, whereas the protocol ISUP (ISDN User Part) is used for signalling between the gateway switching centre GMSC and the switching centre GLR/MSC.

In known mobile telephone systems tracing is normally effected with the aid of a so-called roaming number. In principle, a roaming number is the telephone number which points out the mobile telephone switching centre within whose service area the subscriber is located and also the data record of this subscriber in the register GLR of this switching centre. As soon as a subscriber enters a given area served by a mobile services switching centre, the identity of the subscriber is analyzed in a registration process. Information disclosing the mobile services switching centre in which the subscriber is located is then sent to the home location register HLR. In some systems, for instance the Personal digital telephone system PDC, which has been standardized by I-Node Group (Internode Specifications—Digital Mobile Telecommunications Network, Ver. 3.2, 1992), a roaming number is also sent to the home location register HLR as soon as a subscriber has registered with a switching centre MSC/GLR. This roaming number is allocated by the network but does not belong to any specific subscriber and is normally retained by the subscriber for as long as the subscriber roams in the service area of the switching centre concerned.

When a subscriber calls the mobile, by dialling the directory number of the subscriber, the call is directed to a gateway mobile services switching centre GMSC, which deals with incoming and outgoing signalling and traffic from the mobile network in which the called subscriber belongs. The number is analyzed and is addressed to the field in the home location register HLR in which all data relating to the subscriber is stored. The roaming number is read out from the home location register and then used to call the centre MSC/GLR within whose service area the subscriber is located. The roaming number is used here to address the data record for visiting subscribers in which the data of the called subscriber is registered.

Another method of roaming number allocation is used in GSM and NMT standards. In this case, only one address to the VLR/MSC where a registered subscriber is located is stored in the subscriber data record in the home location register HLR. When a call arrives at the gateway-MSC in the network in which the home location register of the called subscriber is located, a search is made in the home location register HLR for the data record of the calling subscriber. The VLR address is read and used together with the international mobile subscriber identity (IMSI) of the mobile as an address at which a mobile station roaming number (MSRN) can be collected from the register VLR, using an operation referred to as "Collect Roaming Number". This roaming number is sent to the gateway-MSC. The gateway-MSC is now able to establish a connection with the mobile services switching centre MSC/GLR in whose service area the called subscriber is located, while using the roaming number as an address. Since the roaming number is allocated by this switching centre MSC/GLR precisely for this connection, the data record of the called subscriber can be easily found in the subscriber records in MSC/GLR.

The roaming number is not allocated to the subscriber as such, but solely for the purpose of setting-up the desired connection. The roaming number can therefore be released and used for a new call to another subscriber immediately as the preceding connection is released. Consequently, not as many numbers are required as in the earlier case.

SUMMARY

According to the first method, each subscriber who roams in the network is assigned a personal roaming number which is stored in his/her home location register in conjunction with the registering operation and remains reserved and stored in HLR for as long as the subscriber is located within the service area of the mobile services switching centre, which results in numerous problems. For instance, a large number of numbers are seized in the available number series, thereby reducing system capacity. Furthermore, when using this technique, it is extremely difficult to restore the system when faults occur in the registers GLR and HLR, since there is a serious risk that connections will be wrongly made and since signalling will be heavily loaded.

The second method in which only ongoing calls are assigned a roaming number reduces the number of available subscriber numbers. Furthermore, it is necessary for the switching centre GLR/MSC to define and administer the roaming numbers together with the home location register HLR, which affects system processing times.

The problem with the two aforedescribed methods of routing calls to the mobile switching centre area in which the subscriber is located is that there is required a special roaming number which loads the available number series. In addition, serious problems are encountered in restoring the register GLR or HLR after a functional failure, particularly in the case of the solution to the roaming problem described in the I-Node Specification for the PDC system. Since the roaming number is allocated to subscribers dynamically, it is highly probable that after a failure, a given visiting subscriber will be allocated another roaming number which has no relationship with the normal identification number of the subscriber. This renders restoring procedures complicated and uncertain. If the home location register HLR does not receive instructions to erase the link between the system number (IMSI, MSN) of the subscriber and the roaming number and this erasure has been verified, it is possible that a call will be connected to the wrong mobile subscriber because the connection between subscriber number and roaming number is wrong.

The object of the present invention is to provide a method for identifying the position or location of a mobile subscriber which gives direct connection to one of the numbers used in the system to clearly and unambiguously identify a subscriber. According to the invention, this is effected by registering an identification number (PRN) unique for each mobile telephone switching centre in the data records of the subscriber in the home location register HLR, and in the event of a call using this number as a "CALLED ADDRESS" in an IAM-message in a ISUP-signal and connecting to said message the directory number (MSN) of the subscriber and the international mobile subscriber identity number (IMSI) used as an indicator upon access to the register GLR of the mobile services switching centre (MSC/GLR).

BRIEF DESCRIPTION OF THE DRAWINGS

The invention will now be described in more detail with reference to the accompanying drawings, in which.

DETAILED DESCRIPTION

Figure 1:
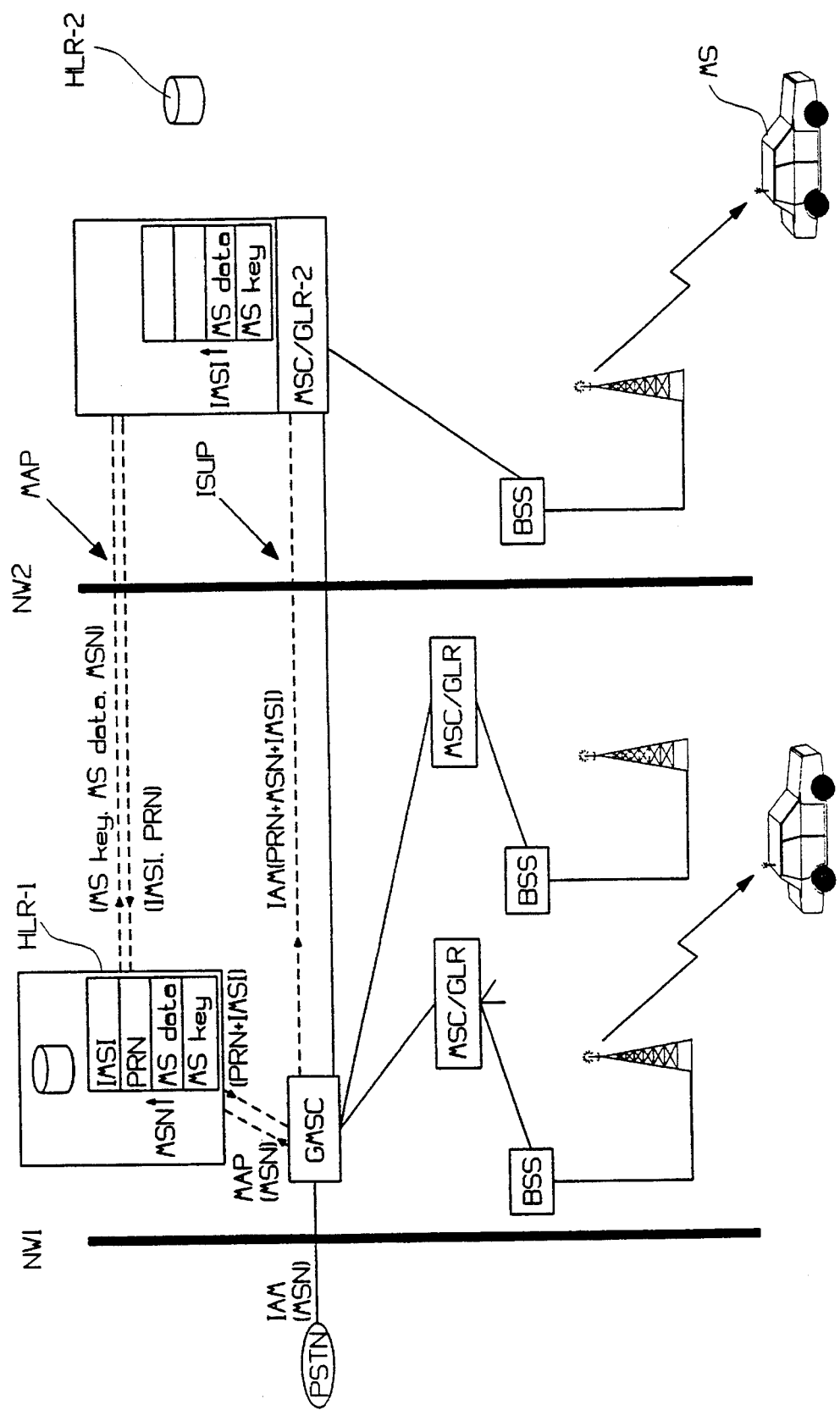
FIG. 1 is a schematic illustration of the signalling of positional and call information.

FIG. 1 illustrates schematically two public land mobile networks (PLMN) referenced NW1 and NW2. Each network includes a number of radio base stations BSS which are connected to the subscribers MS who roam within the network via a radio interface. A number of base stations BSS are served by a mobile services switching centre MSC which handles communication to and from the mobile subscribers MS. Each mobile switching centre MSC has a register GLR which stores data relating to those subscribers which roam in the service area of the switching centre. In the case of the present embodiment, this register is integrated physically with the switching centre MSC and consequently we refer to MSC/GLR as a unit in the following description. Each network has a further register referenced HLR, the home location register. In distinction to the GLR-register, the HLR-register merely contains data concerning those subscribers MS which are registered as belonging to the network. The home location registers HLR may either be free-standing or integrated with a switching centre MSC/GLR.

Signalling is effected between the units of the network by means of the signal protocol MAP (Mobile Application Part) and ISUP defined within the framework of the CCITT Signalling System No. 7. MAP is a protocol especially adapted to support functions, particularly for mobile telephony, and is utilized in the mobile telephone switching centre GLR/MSC, the home location register HLR and the gateway-MSC, so that these nodes are able to communicate with one another, for instance for registering and deregistering the locations of the mobile subscribers, handover, identification and management of subscriber data, by updating the registers GLR/MSC and HLR. Communication concerning the set-up of a connection between the gateway-MSC and a mobile telephone services switching centre MSC/GLR is effected in accordance with the protocol ISUP (ISDN User Part), where the procedure IAM (Initial Address Message) is of particular interest to the invention. In the FIG. 1 illustration, pure control channels (MAP) have been denoted with broken lines, while communication channels have been denoted with full lines. Communication between the mobile subscribers and the mobile telephone services switching centre GLR/MSC does not concern the invention and will not therefore be described in detail.

Positional registration is effected in accordance with a set procedure immediately as a mobile subscriber enters the service area of a mobile telephone services switching centre, for instance MSC/GLR-2 in the network NW2. Among other things, this means that the number IMSI (International Mobile Station Identity), which unambiguously identifies the terminal and which is stored in the mobile terminal MS, is stored in the mobile telephone switching centre MSC/GLR-2. This switching centre now calls the home location register HLR in the network NW1, using the IMSI-number as a pointer. Data MS-data and MS-key is collected from the searched data record and passed to MSC/GLR-2 for authentication of the visiting mobile station. An identification number PRN (Pursuit Routing Number) which denotes an address in the system number plan that clearly identifies this mobile telephone services switching centre MSC/GLR-2 is transmitted to the home location register HLR-1 in a MAP operation "Location Registration" together with an IMSI for the mobile MS1. There has now been created in HLR-1 a data record which includes a first link between the switching centre MSC/GLR-2 and the subscriber MS.

Figure 2:
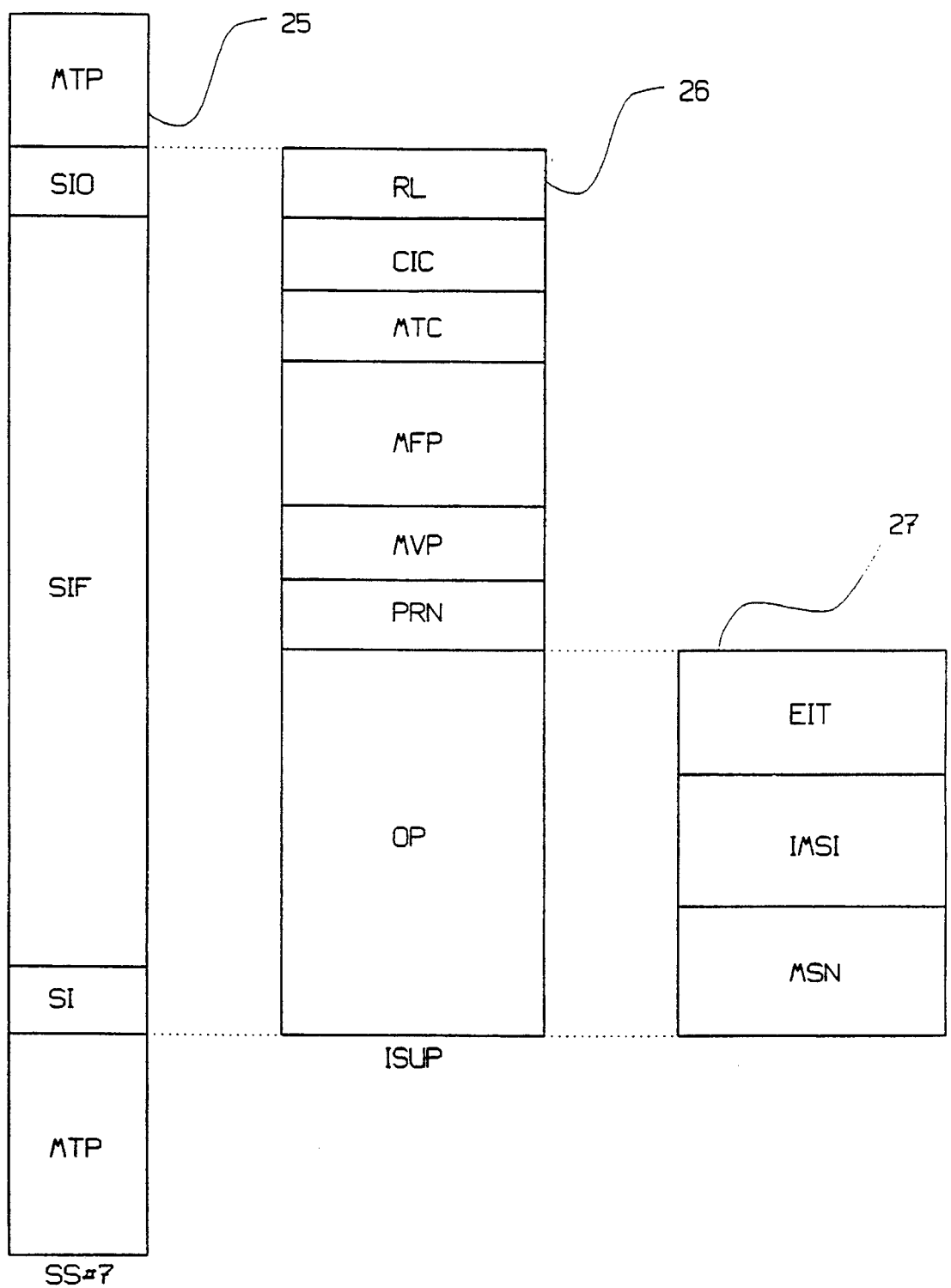
FIG. 2 illustrates schematically the construction of an IAM-message in accordance with the ISUP-protocol.

The reference 25 in FIG. 2 identifies in principle the general format of a signal frame in CCITT signal system No. 7. The frame is begun and terminated with a respective block MTP (Message Transfer Part) which includes transmission control information. Located between the blocks MTP is a Signal Information Field (SIF) which defines the information to be transmitted on the common signal channel. SIO (Service Information Octet) identifies a field which discloses the type of service represented by SIF.

When the frame is intended to represent an ISUP-message, the field SIF will have the structure disclosed in frame 26. The ISUP-message is introduced with a Routing Label RL and a Circuit Identification Code (CIC) which contains the information necessary for transmitting the packet through the common signalling channel. The field MTC (Message Type Code) discloses the type of message to follow. A message for transmitting call information is given as IAM (Initial Address Information) and will be described in the following. The fields MFP (Mandatory Fixed Part), MVP (Mandatory Variable Part) and OP (Optional Part) are data parameter fields. PRN is inserted in the field MVP beneath the parameter name "Called Party Number". The field OP is shown in detail in block 27 and is intended for optional subsidiary information and has been placed in the subscriber identities IMSI (International Mobile Subscriber Identity) and MSN (Mobile Subscriber Number) under the parameter designation "End Information Transfer" (EIT). By using the optional field OP, it is possible to transmit an IAM-message which contains all the information PRN, IMSI, MSN required to ambiguously address the called mobile subscriber MS.

For instance, when a call arrives, for instance, from the permanent PSTN-network in the form of an IAM-message with the directory number MSN as a "Called Party Address" the call is routed to the gateway-MSC in the network NW1 in which the subscriber MS belongs. The call is analyzed in the gateway-MSC, which sends to the home location register HLR-1 a query concerning route selection information with the MAP-operation "Terminating Call Routing Retrieval" with the directory number MSN as a parameter. Using the directory number MSN as a pointer, the subscriber identity number IMSI and the switching centre MSC/GLR number PRN are collected from the called subscriber data record in HLR-1 and sent in a MAP-message "Terminating Call Routing Retrieval ACK" back to the gateway-MSC. The PRN-number of the switching centre, the subscriber identity number IMSI and the directory number MSN are included in gateway-MSC in an IAM-message according to the ISUP-protocol with the switching centre number PRN as the "Called Party Number" as described above. This message is used to set up the call between the gateway-MSC and the mobile telephone services switching centre MSC/GLR-2 in the service area in which the called subscriber roams. The identity number IMSI read out from HLR-1 and sent from gateway-MSC in an IAM-message is used as a pointer to identify the called mobile unit MS in MSC/GLR-2.

The aforedescribed procedures mean that the load on the available number series will be much lighter than in the known systems described in the introduction, especially with regard to PDC in accordance with the I-Node Specification. In addition, the communication of control data is greatly simplified in conjunction with the MAP-procedure "Location Registration" and "Terminating Call Routing Retrieval".

As mentioned above, with the known principle (e.g. PDC) of separate roaming numbers, problems can arise in reconstructing the information in the visitor location register GLR of the mobile switching centre MSC/GLR when a fault occurs in the register. In the home location register HLR, the temporarily allocated roaming number, which does not contain information concerning the actual MSN-number or IMSI-number of the subscriber, is linked to the subscriber number fully dynamically as a pointer to a subscriber data record in the GLR-register. Should information in the GLR-register disappear because of a failure, it is necessary to erase all links between those roaming numbers that have been allocated by the GLR-register and the subscriber records in the home location register HLR, since the subscribers will be allocated new roaming numbers when data in the GLR-register is reconstructed. Furthermore, all of the earlier links must be broken-up and new links established and confirmed in a localizing operation. There is a serious risk that incoming calls will be routed to wrong subscribers before this can be achieved, due to the lack of agreement between the registers GLR and HLR with regard to the link between the roaming number and the subscriber numbers MSN and ISDN.

There is no risk of mismatch when using the described inventive arrangement. It is not necessary to directly update the subscriber records in the home location register HLR other than in those cases when subscribers have left or when new subscribers enter the service area of the switching centre MSC/GLR.

For instance, when a register GLR-2 for roaming mobile subscribers has been out of function, restoration is initiated by setting the register to zero. It should be noted that in this state of the system, it is unnecessary to inform the home location register HLR-2 that GLR has been restarted. When the first radio contact is made with those subscribers MS who roam into the service region of the switching centre MSC/GLR-2, it is established that no subscriber data records are found in the GLR-register. This contact can be taken, for instance, upon receipt of an outgoing call from MS in a subsidiary service procedure not associated with calls, or in a normal position registration procedure. The GLR-register will normally contain data which is collected from the mobile MS, for instance IMSI, and data which is collected from the home location register HLR-1, for instance authenticating data. When the first radio contact is made without the data collected from the home location register HLR being found in the register GLR-2, a call is made to the home location register HLR-1 of the subscriber in a MAP procedure and data is transferred to the register GLR-2 in another MAP procedure. Data from MS and HLR-1 are compiled in the register in GLR-2, thereby restoring the GLR-2 records.

This procedure is repeated as mobile subscribers MS within the service area make radio contact with the switching centre MSC/GLR-2, which collect data from associated home location registers HLR, until the subscriber data of all mobile subscribers is restored in GLR.

When a home location register HLR receives a request for data from a mobile telephone MSC/GLR, it is important that the whole of the data transfer procedure is continued even when the address PRN of the mobile services switching centre MSC/GLR stored in the home location register HLR coincides with the address of the mobile services switching centre MSC/GLR that started the procedure. It must not be assumed that data is the same as when the PRN-address of the switching centre MSC/GLR was stored for the first time and that a new transfer is unnecessary, since the GLR-register that requests new data may have suffered a fault and have been restarted as a result thereof.

Restoration can also be effected in a simple manner when a fault has occurred in the home location register HLR. The home location register HLR contains important information relating to all subscribers registered therein, including information concerning available services and other subscriber data, and also data as to where the subscribers are located. These latter items of information consist of the PRN-number of the mobile services switching centre MSC/GLR in the service area in which the subscriber MS roams. This information is normally updated when the mobile subscriber roams from the service area of one mobile services switching centre MSC/GLR to another switching centre, which can take place several times during the course of a day. If a home location register HLR must be restarted because of a fault, it is not certain that the security copy taken by HLR periodically will give fully correct information. It is therefore necessary to bring HLR up to date in this respect. This can be readily achieved in accordance with the invention, where a PRN-call number for MSC/GLR is used instead of a special roaming number.

The restoration process is begun by a restarted home location register HLR transmitting the MAP-operation "Initialize", which includes the home location register number, to all mobile telephone services switching centres MSC/GLR in the system. When a switching centre MSC/GLR receives the "Initialize"-message, message, the register GLR will search all data records in which the number of this home location register HLR is stored. The HLR-number is normally stored when the mobile subscriber MS enters the service area of this switching centre MSC/GLR. All subscribers which belong to the HLR that has been recopied are marked in the GLR-register by placing a flag "HLR Confirmation Flag" on "Not Confirmed". When the next radio contact is made with the mobile subscriber, for instance in conjunction with an outgoing call, response to "paging call", procedures for subsidiary services outgoing from the mobile subscriber MS and positional registration initiated by the mobile subscriber, the GLR-register checks the setting of "HLR Confirmation Flag". If this setting is marked "HLR Not Confirmed", the PRN-number of the switching centre is updated in the home location register HLR.

The procedure is repeated for all subscribers belonging to the restarted home location register HLR immediately the subscribers make radio contact with the mobile services switching centre MSC/GLR in whose service area the subscribers are located. Gradually, all mobile subscribers will be updated in the home location register and restoration is then terminated.

What is claimed is:

1. A method for restructuring a standardized call signal frame arriving at a mobile telephone system, the frame including a first parameter field having a directory number for a subscriber roaming in the mobile telephone system, and a second parameter field into which optional information can be inserted, comprising the steps of:

replacing the directory number in the first parameter field with a unique routing number to a mobile telephone services switching center in whose service area the mobile subscriber roams; and placing a subscriber unique identification number and directory number in the optional information space of the second parameter field.

2. The method of claim 1, further comprising the step of collecting the unique routing number and the unique identification number of a called subscriber from data records of the called subscriber in a home location register with the called subscriber's directory number as a pointer.

3. The method of claim 1, further comprising the step of placing the unique routing number in the data records of the called subscriber in the home location register in a registering operation in which the unique identification number of the subscriber is used as a pointer.

4. A method of transferring, from a gateway mobile switching center in a first mobile telephone network, call information relating to a mobile subscriber, which roams in a second mobile telephone network and which has home registration in the first mobile telephone network, to a mobile switching center within whose service area the mobile subscriber is located, comprising the steps of:

extracting from a signal message incoming to the gateway mobile switching center a subscriber's directory number relating to the called mobile subscriber; and using the extracted directory number as a pointer to collect, from data records allocated to the called mobile subscriber in a home location register in the first network, a first unique routing number to the mobile telephone switching center and a unique subscriber identification number to the gateway mobile switching center;

wherein the unique routing number, the unique identification number, and the subscriber's directory number are compiled to form a new call message which is sent to the mobile telephone switching center pointed-out by the routing number and in whose register section other parameters for setting up a connection to the mobile subscriber are collected while using the unique identification number as a pointer.

5. An apparatus for restructuring a standardized call signal frame arriving at a mobile telephone system, the frame including a first parameter field having a directory number for a subscriber roaming in the mobile telephone system, and a second parameter field into which optional information can be inserted, comprising:

means for replacing the directory number in the first parameter field with a unique routing number to a mobile telephone services switching center in whose service area the mobile subscriber roams; and means for placing a subscriber unique identification number and directory number in the optional information space of the second parameter field.

6. The apparatus of claim 5, further comprising means for collecting the unique routing number and the unique identification number of a called subscriber from data records of the called subscriber in a home location register with the called subscriber's directory number as a pointer.

7. The apparatus of claim 6, further comprising means for placing the unique routing number in the data records of the called subscriber in the home location register in a registering operation in which the unique identification number of the subscriber is used as a pointer.

\* \* \* \* \*